(12) United States Patent
Leng

(10) Patent No.: US 10,427,387 B2
(45) Date of Patent: Oct. 1, 2019

(54) PLASTIC BOARD WITH METAL NET

(71) Applicant: NEW-TEC INTEGRATION (XIAMEN) CO., LTD., Xiamen, Fujian (CN)

(72) Inventor: Luhao Leng, Fujian (CN)

(73) Assignee: NEW-TEC INTEGRATION (XIAMEN) CO., LTD., Xiamen (CN)

( * ) Notice: Subject to any disclaimer, the term of this patent is extended or adjusted under 35 U.S.C. 154(b) by 134 days.

(21) Appl. No.: 15/676,501

(22) Filed: Aug. 14, 2017

(65) Prior Publication Data

US 2018/0056634 A1   Mar. 1, 2018

(30) Foreign Application Priority Data

Aug. 31, 2016   (CN) .......................... 2016 1 0786299

(51) Int. Cl.
*B32B 27/12* (2006.01)
*B32B 5/02* (2006.01)
*B32B 7/12* (2006.01)

(52) U.S. Cl.
CPC .............. *B32B 27/12* (2013.01); *B32B 5/028* (2013.01); *B32B 7/12* (2013.01); *B32B 2262/103* (2013.01)

(58) Field of Classification Search
CPC ....................................................... B32B 27/12
USPC ........................................................... 428/121
See application file for complete search history.

(56) References Cited

U.S. PATENT DOCUMENTS

2013/0075408 A1*   3/2013   Childress ............. B65D 90/022
220/560.01

* cited by examiner

*Primary Examiner* — Brent T O'Hern
(74) *Attorney, Agent, or Firm* — Rabin & Berdo, P.C.

(57) ABSTRACT

A plastic board has a metal net supporting the bottom surface of the plastic board. The plastic board encases the metal net by vacuum forming to make a composite structure. The plastic board thickness can be less than 1.0 mm. The metal net is disposed below the plastic board, the top surface of the plastic board is for placing items.

21 Claims, 14 Drawing Sheets

PLASTIC BOARD WITH METAL NET

FIELD OF THE INVENTION

The present invention relates to a plastic board with metal net.

BACKGROUND OF THE INVENTION

Plastic boards are common used in furniture manufacturing. The plastic boards can be used to make table top, chair seat and back, horizontal, perpendicular, clap board, drawer board of bookrack and cabinet, etc. Plastic boards are more and more common. Existing plastic boards used to make above products are manufactured by injecting, blowing and absorbing. For injecting, the plastic boards are limited, particularly for table top with large size, the manufacturing needs high-level equipments and the process is difficult. For blowing, although the blowing plastic boards have clean appearance and are easy to clean, the boards are thick, especially large size products, the production period is long and the production efficiency is low, large quantity of devices and dies are needed, the manufacturing process is complicated, making the cost high and influencing the product competitiveness. For absorbing, the plastic board is compositing by two or more plastic boards, leading to large dosage of plastic, moreover, the strength of this kind of the plastic board has some limitation.

SUMMARY OF THE INVENTION

The present invention is provided with a plastic board with metal net, which has high strength and thin board wall, and it uses small quantity of plastic. The technical proposal of the present invention is that:

A plastic board with metal net, comprising a plastic board, wherein further comprising a metal net, the metal net supports the bottom surface of the plastic board, the plastic board encases the metal net by vacuum forming to make the plastic board and the metal net forming a composite structure.

A plastic board with metal net, comprising: a plastic board, which is a squeeze sheet or a single structure by squeezing and absorbing; wherein further comprising: a metal net, which is a net welded or weaved by metal wire or a net made by pressing and extending a metal board, the metal net is disposed below the plastic board; and a plastic element, which is disposed between the plastic board and the metal net, the plastic element is used to connect the plastic board and the metal net.

A plastic board with metal net, comprising: a plastic board, which is a squeeze sheet or a single structure by squeezing and absorbing; wherein further comprising: a metal net, which is a net welded or weaved by metal wire or a net made by pressing and extending a metal board, the metal net is disposed below the plastic board, the plastic board and the metal net are glued together.

Compared to the existing known technology, the technical proposal of the present invention has advantages:

The plastic board is a thin sheet by squeezing or absorbing, the thickness can be less than 1.5 mm, or even 1.0 mm this kind of plastic board is light and is made by small quantity of plastic, thus saving the cost; the metal net is disposed below the plastic board, the top surface of the plastic board is for placing items. The metal net provides solid support to the plastic board to prevent the plastic board 10 from caving downwardly, making the bearing performance of the plastic board greatly increased and ensuring the plastic board with well flatness.

BRIEF DESCRIPTION OF THE DRAWINGS

The present invention will be further described with the drawings and the embodiments.

DETAILED DESCRIPTION OF THE EMBODIMENTS

The First Embodiment

Figure 1:
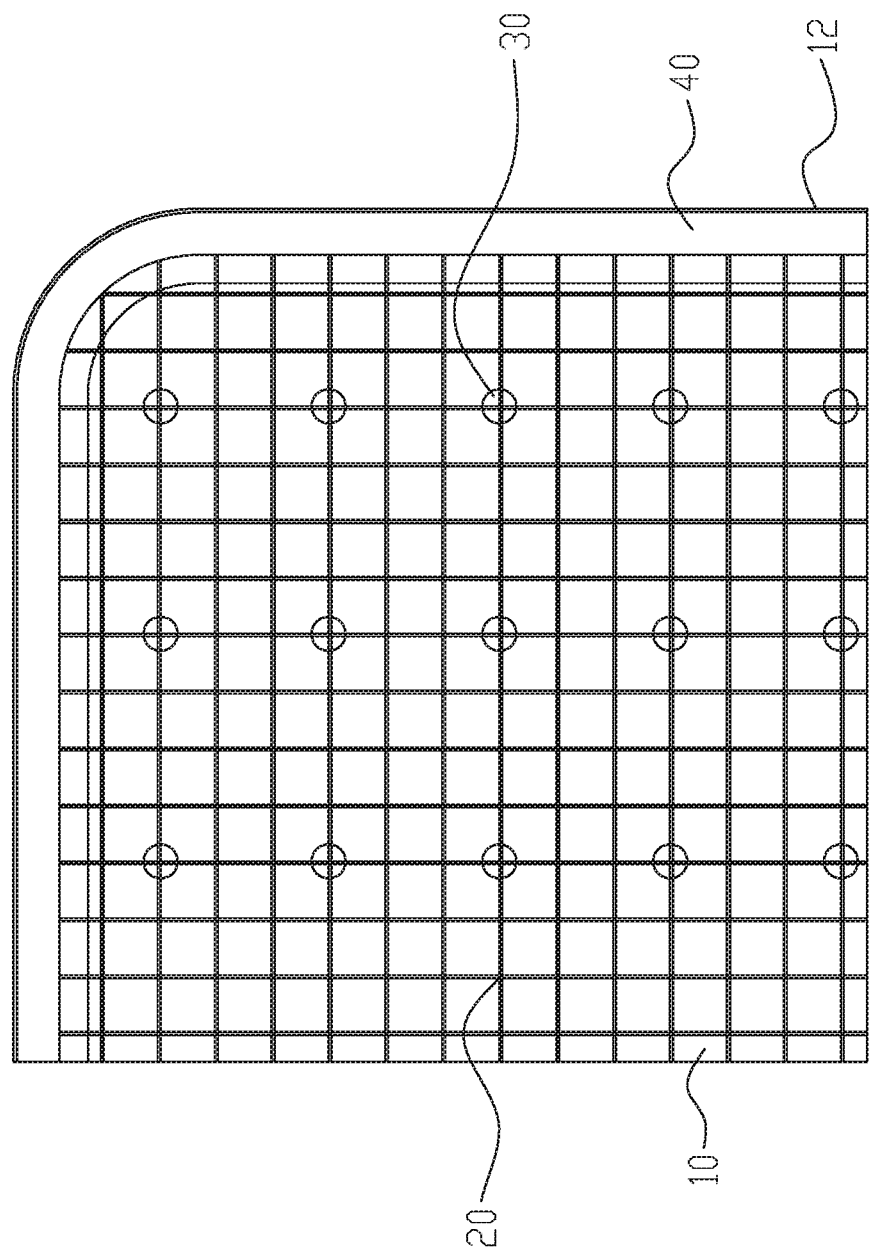
FIG. 1 illustrates a partial and bottom view of a plastic board with metal net of a first embodiment of the present invention.
Figure 2:
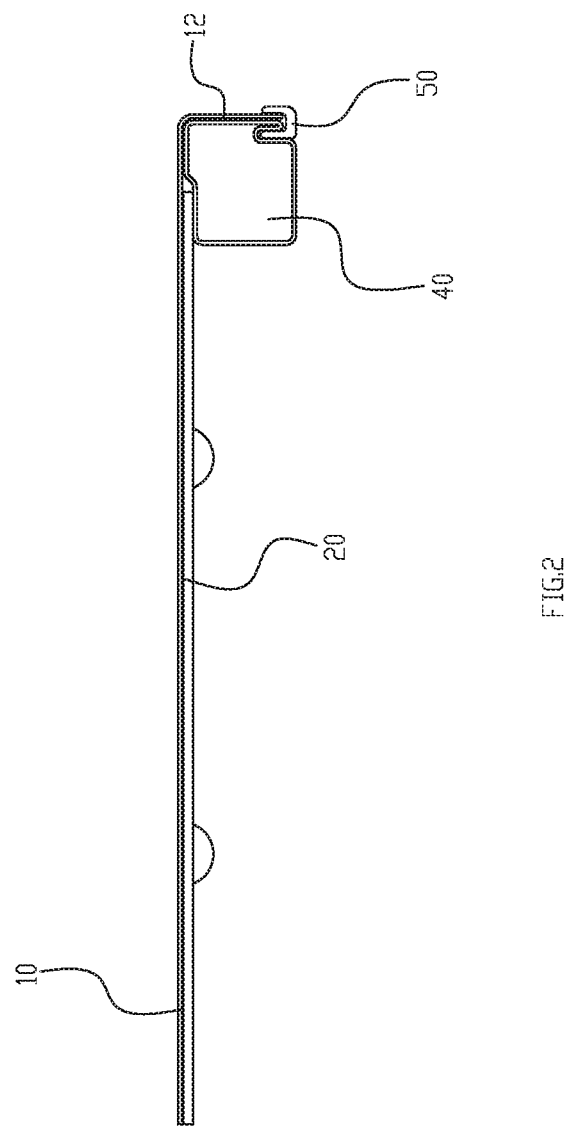
FIG. 2 illustrates a sectional diagram of the plastic board of FIG. 1.

Referring to FIG. 1 and FIG. 2, the plastic board with metal net comprises a plastic board 10 and a metal net 20. The plastic board 10 is a squeeze sheet or a single structure by squeezing and absorbing, the thickness can be 1.0 mm, 1.1 mm or 1.2 mm. The metal net 20 is a net welded or weaved by metal wires. The metal net 20 supports on the bottom surface of the plastic board 10, the top surface of the plastic board 10 is for placing items. The metal net 20 provides solid support to the plastic board 10 to prevent the plastic board 10 from caving downwardly.

The plastic board 10 and the metal net 20 needn't other connections, that is to say, the metal net 20 directly supports the bottom surface of the plastic board 10. In another case, both can be connected by glue, screws or metal wires. Preferred, the plastic board 10 and the metal net 20 are connected by a plastic element 30.

The plastic element 30 is fixedly connected to the metal net 20, the top surface of the plastic element 30 supports the bottom surface of the plastic board 10, preferred, the top surface of the plastic element 30 and the bottom surface of the plastic board are glued or welded. Preferred, the metal net 20 is a net sheet welded or weaved by metal wires, and the plastic element 30 is disposed at the position the metal wires intersect, that is the node of the metal net.

This embodiment further comprises a frame 40 surrounding the metal net 20, the metal net 20 is connected to the frame 40. The periphery of the plastic board 10 extends downwardly to form a sidebar 12, the sidebar 12 surrounds the external side of the frame 40, partial or whole of the plastic board 10 covers the frame 40. An edge band 50 is further configured, the edge band 50 is arranged along the bottom edge of the sidebar 12 of the plastic board, the edge band 50 covers the connecting gap of the plastic board 10 and the frame 40. The bottom surface of the frame 40 is disposed with a groove, the cross section of the edge band 50 is Π shaped, the inner side of the edge band 50 is inserted to the groove.

The frame 40 is made of metal, injecting plastic or squeezing plastic, the frame 40 is glued, welded or locked to the plastic board 10.

The Second Embodiment

Figure 3:
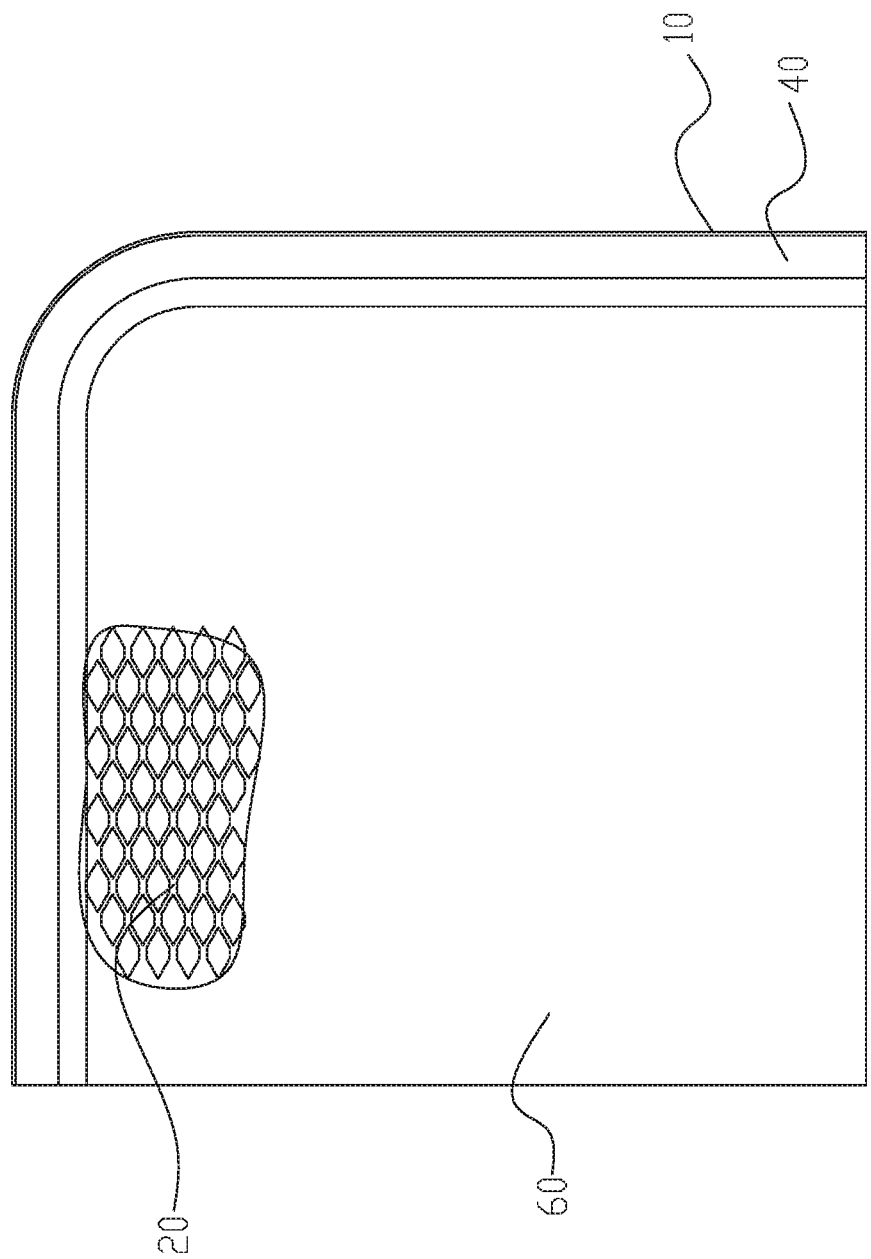
FIG. 3 illustrates a partial and bottom view of a plastic board with metal net of a second embodiment of the present invention.

Referring to FIG. 3, this embodiment differs from the first embodiment in that: the metal net 20 is a net made by pressing and extending a metal board; furthermore, this embodiment further comprises a decoration sheet used to cover the metal net, the decoration sheet 60 is disposed below the metal net 20.

The Third Embodiment

Figure 4:
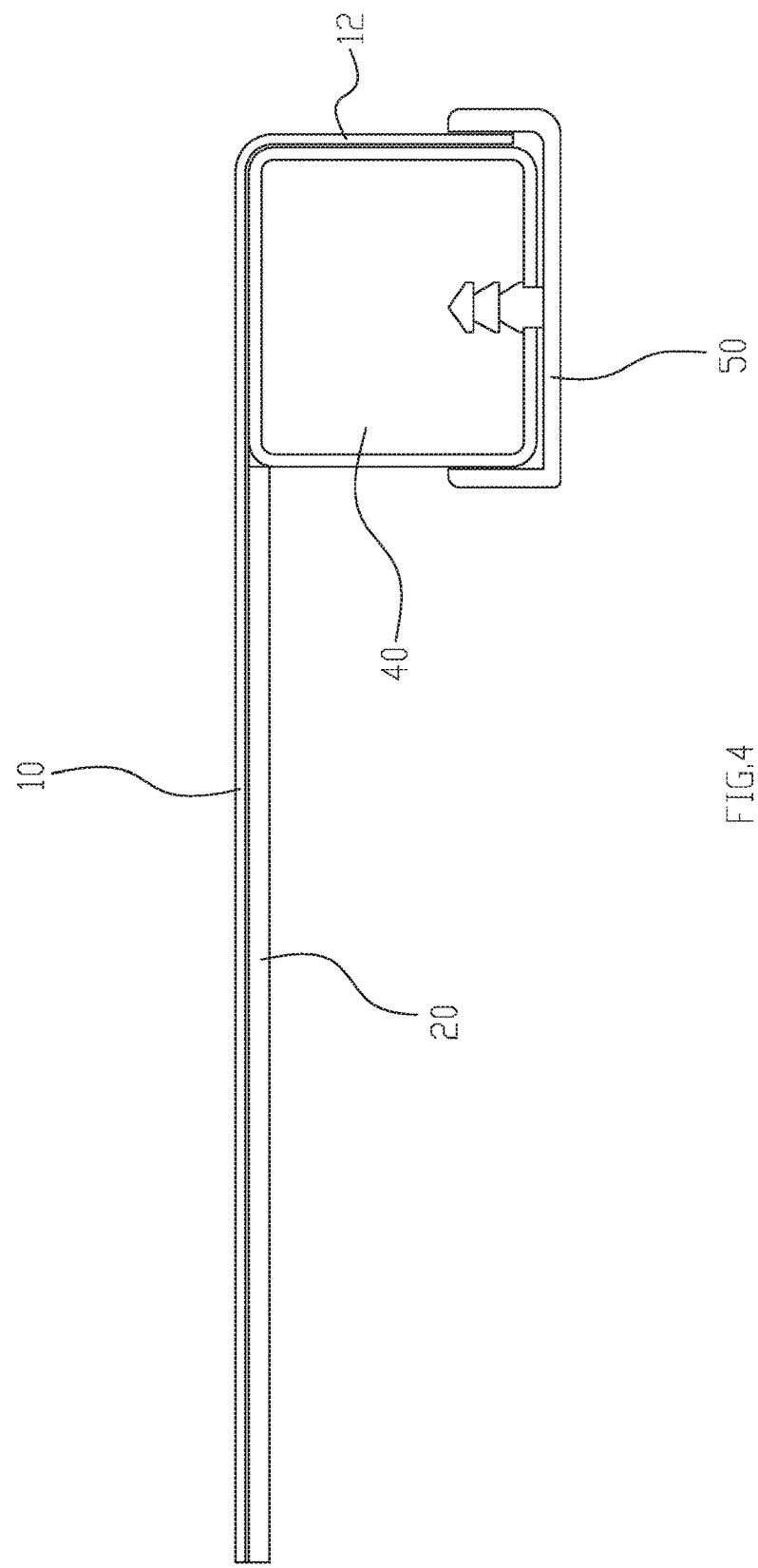
FIG. 4 illustrates a sectional diagram of a plastic board with metal net of a third embodiment of the present invention.

Referring to FIG. 4, this embodiment differs form the first embodiment in that: the bottom surface of the frame 40 is flat. The edge band 50 encases the bottom surface of the frame 40 completely.

The Fourth Embodiment

Figure 5:
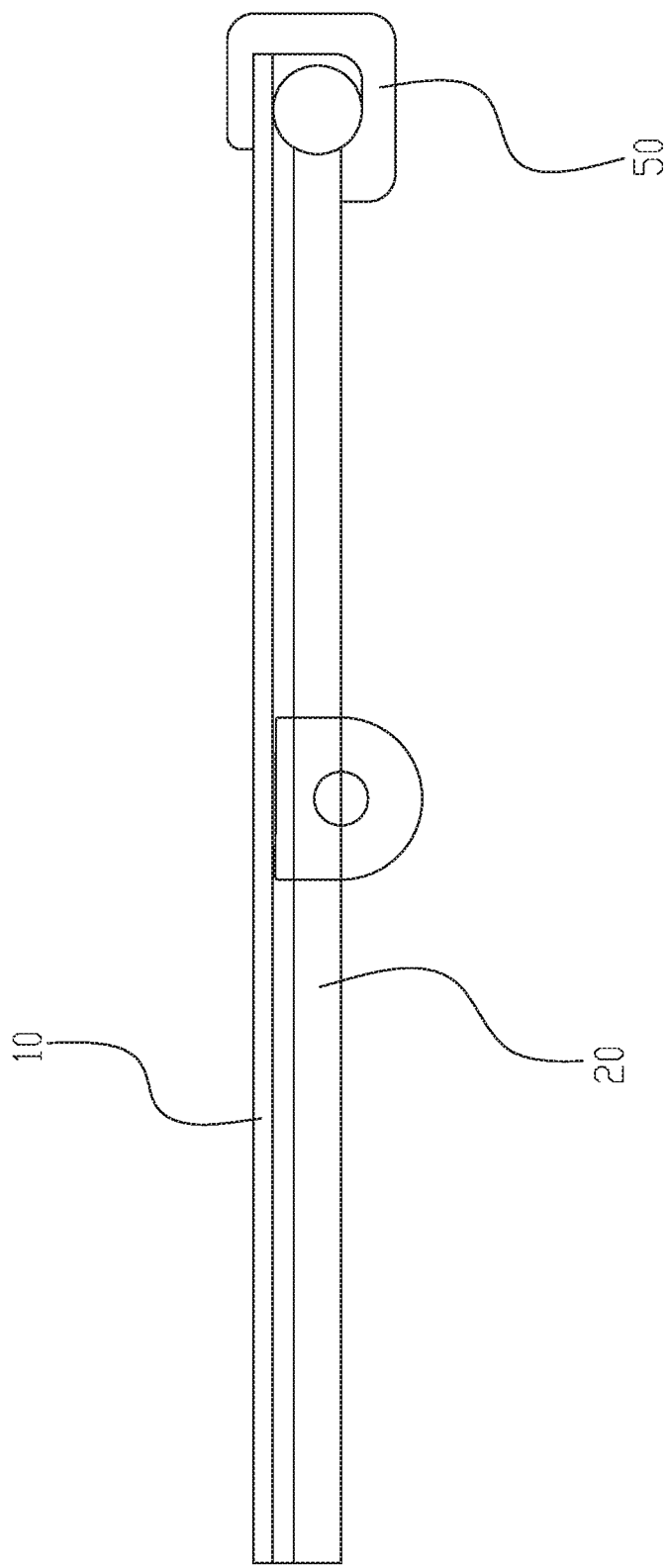
FIG. 5 illustrates a sectional diagram of a plastic board with metal net of a fourth embodiment of the present invention.

Referring to FIG. 5, this embodiment differs from the first embodiment in that: no frame is provided, the edge band 50 is disposed along the edge of the plastic board 10, the edge band 50 encases the external edge of the plastic board 10 and the metal net 20.

The Fifth Embodiment

Figure 6:
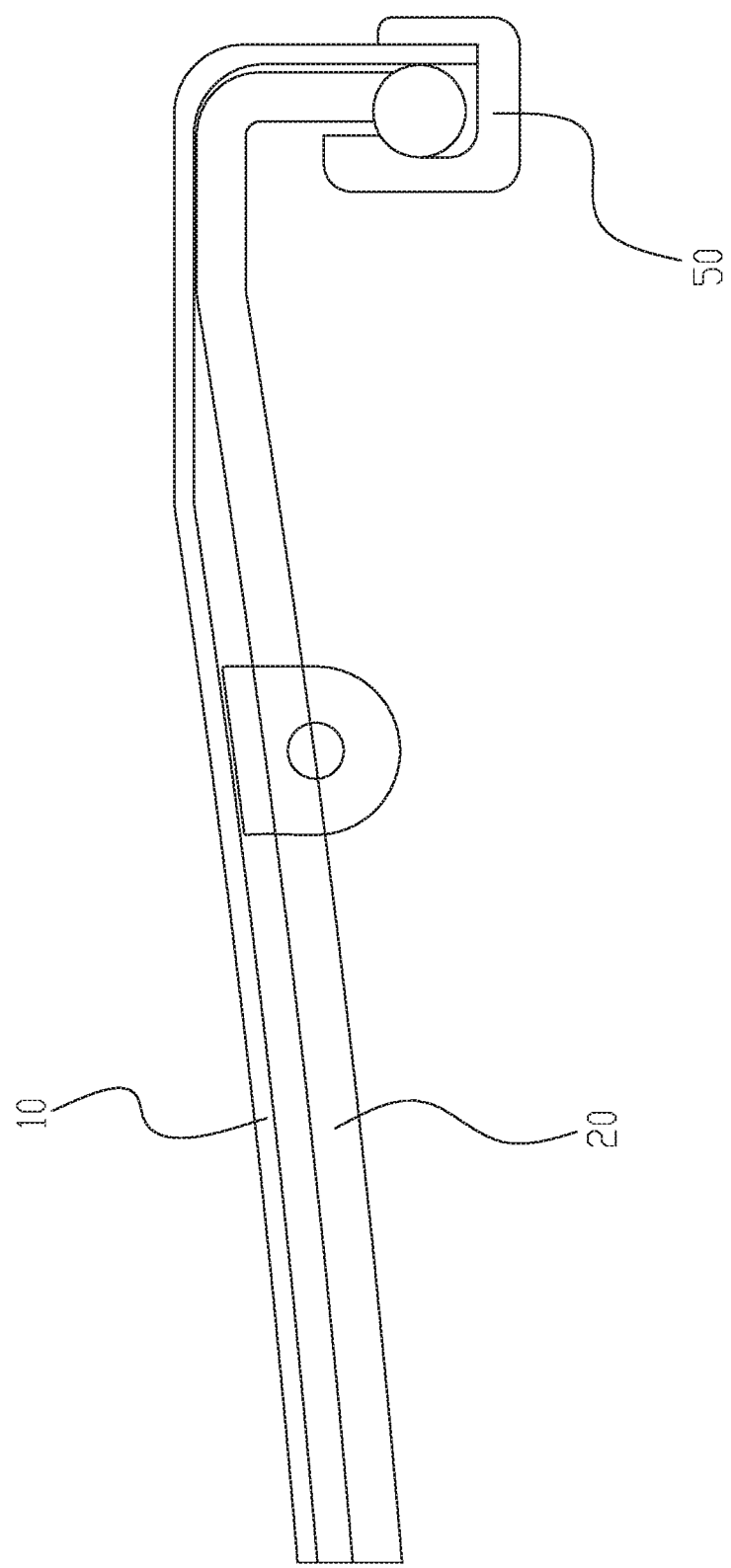
FIG. 6 illustrates a sectional diagram of a plastic board with metal net of a fifth embodiment of the present invention.

Referring to FIG. 6, this embodiment differs from the fourth embodiment in that: the central portion of the plastic board with metal net is concaved to form a curve shape, such that the plastic board can be served as a seat board.

The Sixth Embodiment

Figure 7:
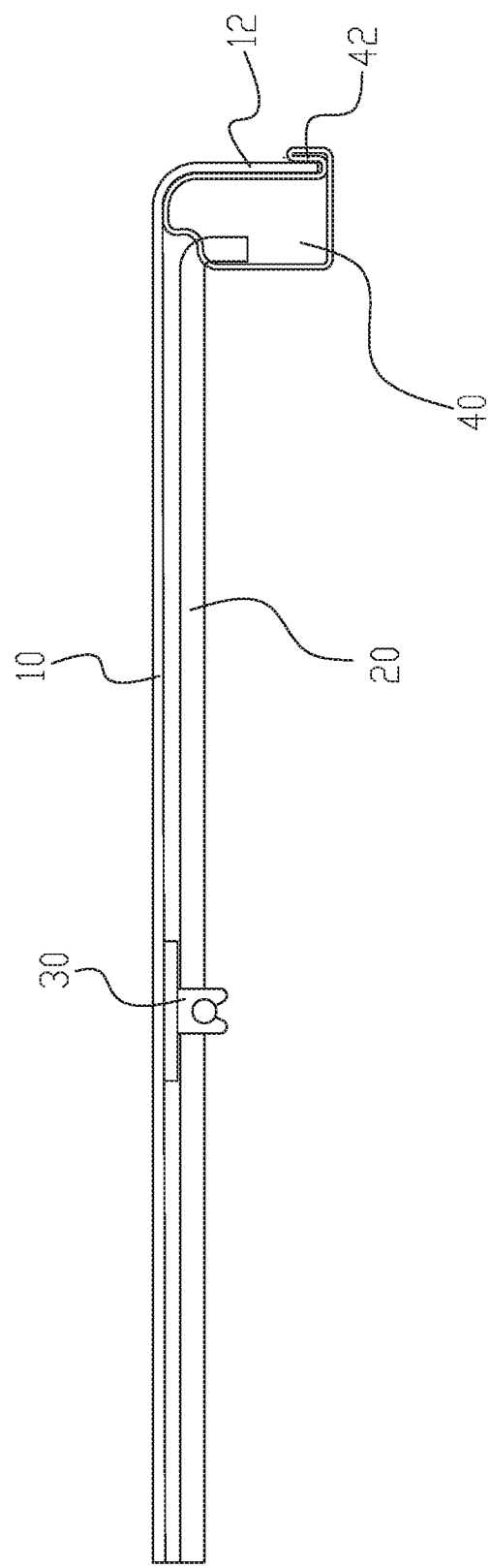
FIG. 7 illustrates a sectional diagram of a plastic board with metal net of a sixth embodiment of the present invention.
Figure 8:
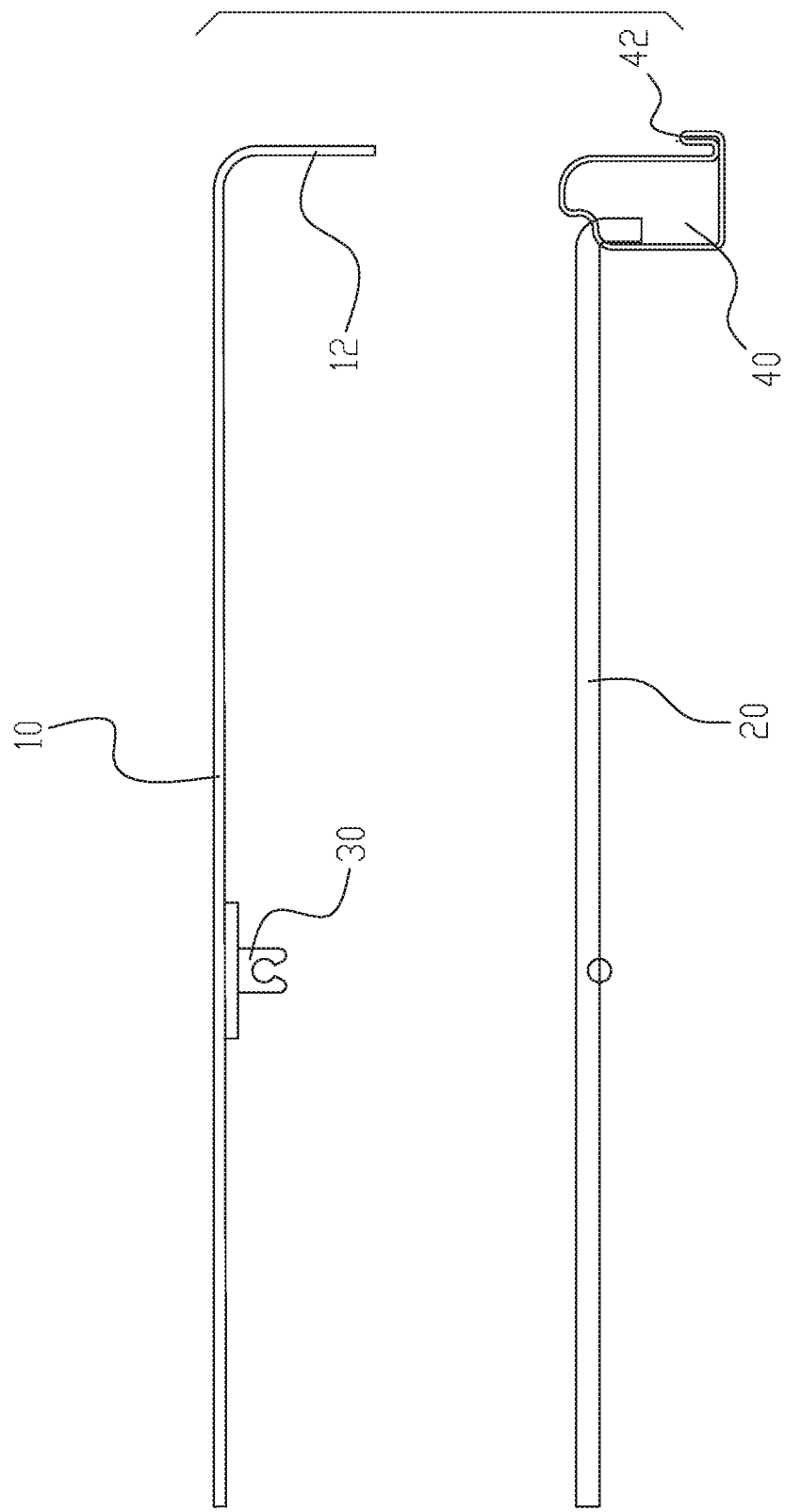
FIG. 8 illustrates an exploded diagram of the plastic board with metal net of FIG. 7.

Referring to FIG. 7 and FIG. 8, this embodiment differs from the first embodiment in that: the top surface of the plastic element 30 and the bottom surface of the plastic board 10 are glued or welded, the plastic element 30 is locked to the metal net 20 for convenient assembly and disassembly; no edge band is configured, the bottom portion of the external side of the frame 40 bends outwardly to form a hem 42, the hem 42 encases the lower edge of the side 12 of the plastic board.

The Seventh Embodiment

Figure 9:
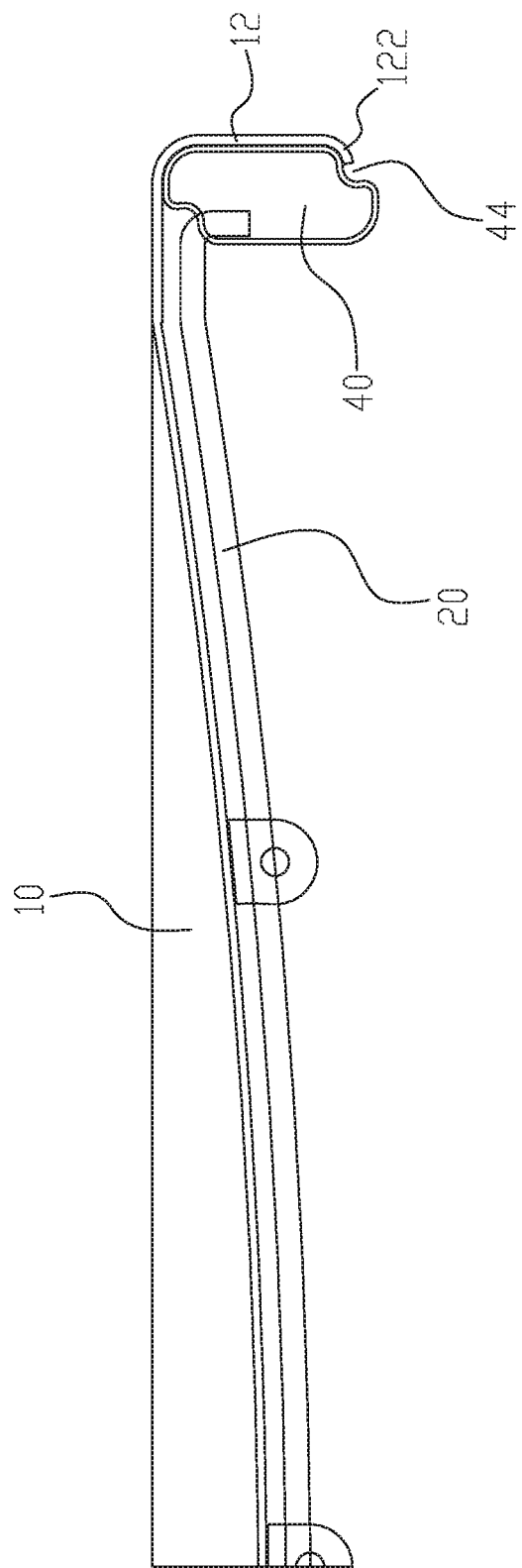
FIG. 9 illustrates a sectional diagram of a plastic board with metal net of a seventh embodiment of the present invention.
Figure 10:
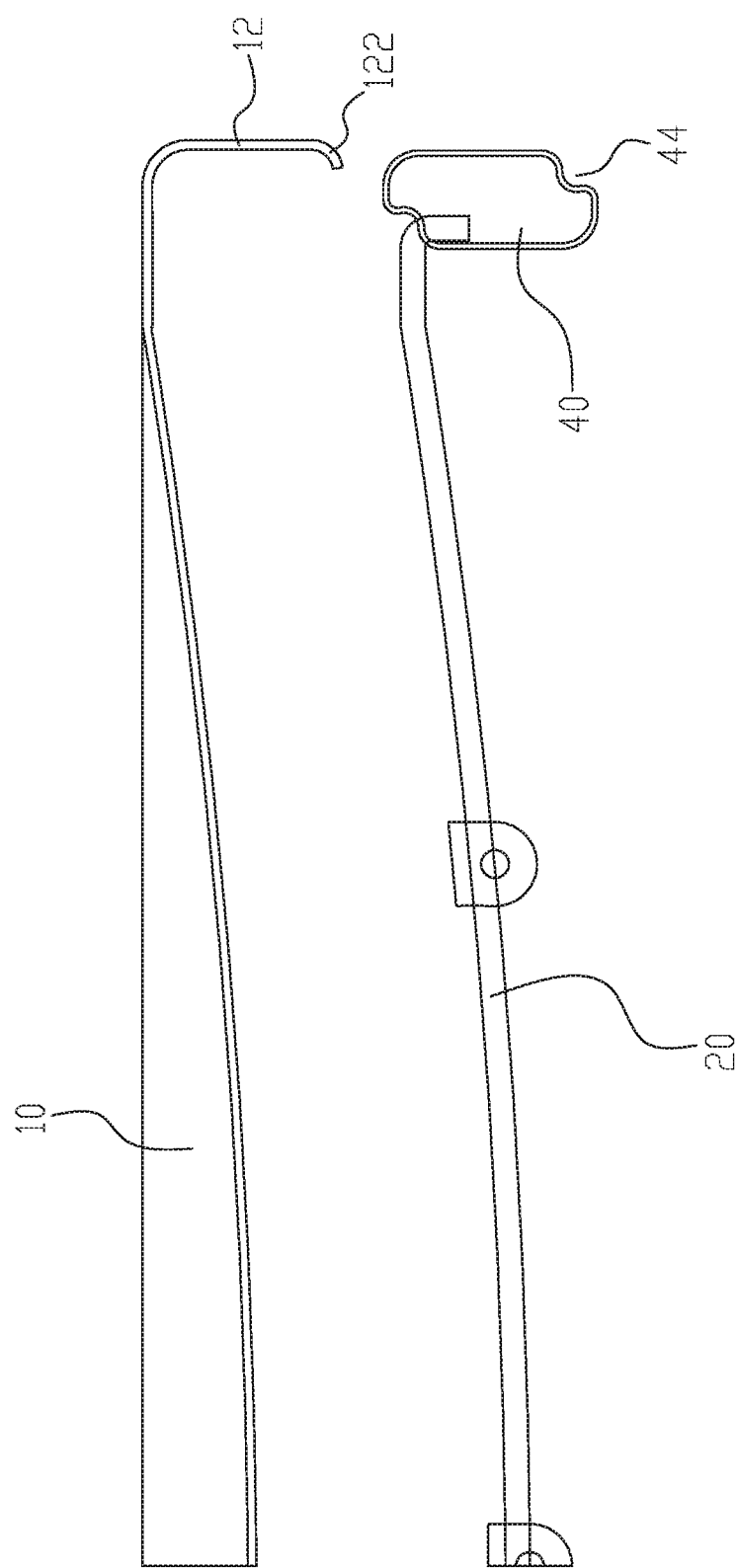
FIG. 10 illustrates an exploded diagram of the plastic board with metal net of FIG. 9.

Referring to FIG. 9 and FIG. 10, this embodiment differs from the first embodiment in that: no edge band is configured, the lower edge of the side 12 of the plastic board bends inwardly and extending to form a hook 122, the bottom portion of the external side of the frame 40 is disposed with a groove 44, the hook 122 is locked to the groove 44; the central portion of the plastic board and the metal net are concaved downwardly, such to be served as a seat board.

The Eighth Embodiment

Figure 11:
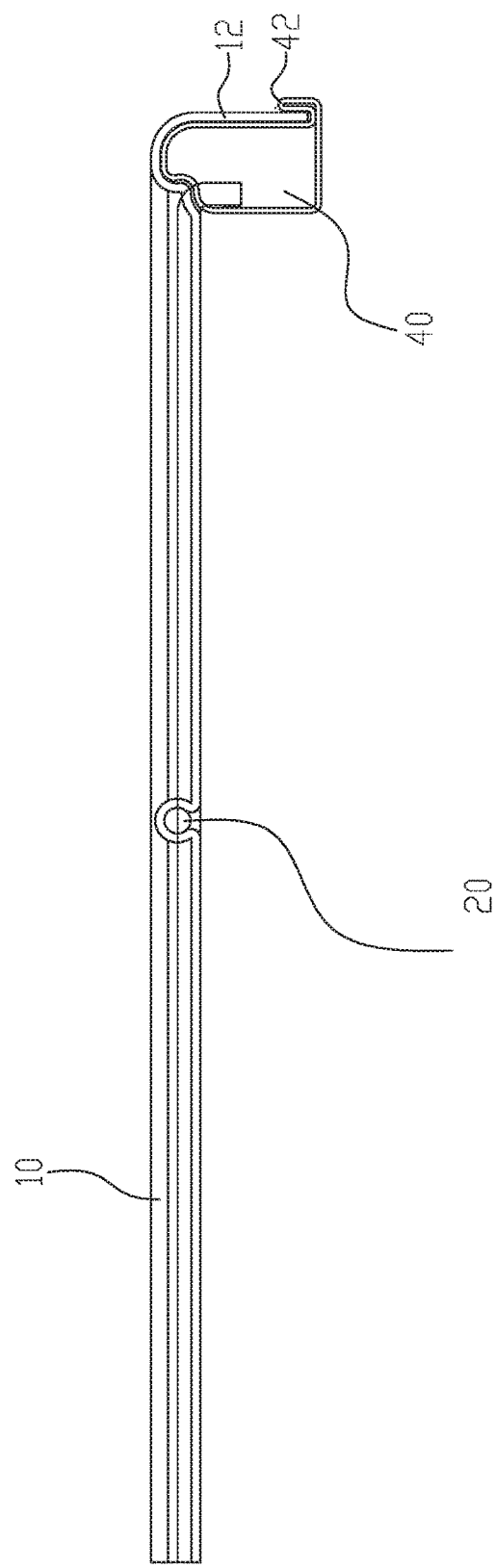
FIG. 11 illustrates a sectional diagram of a plastic board with metal net of an eighth embodiment of the present invention.
Figure 12:
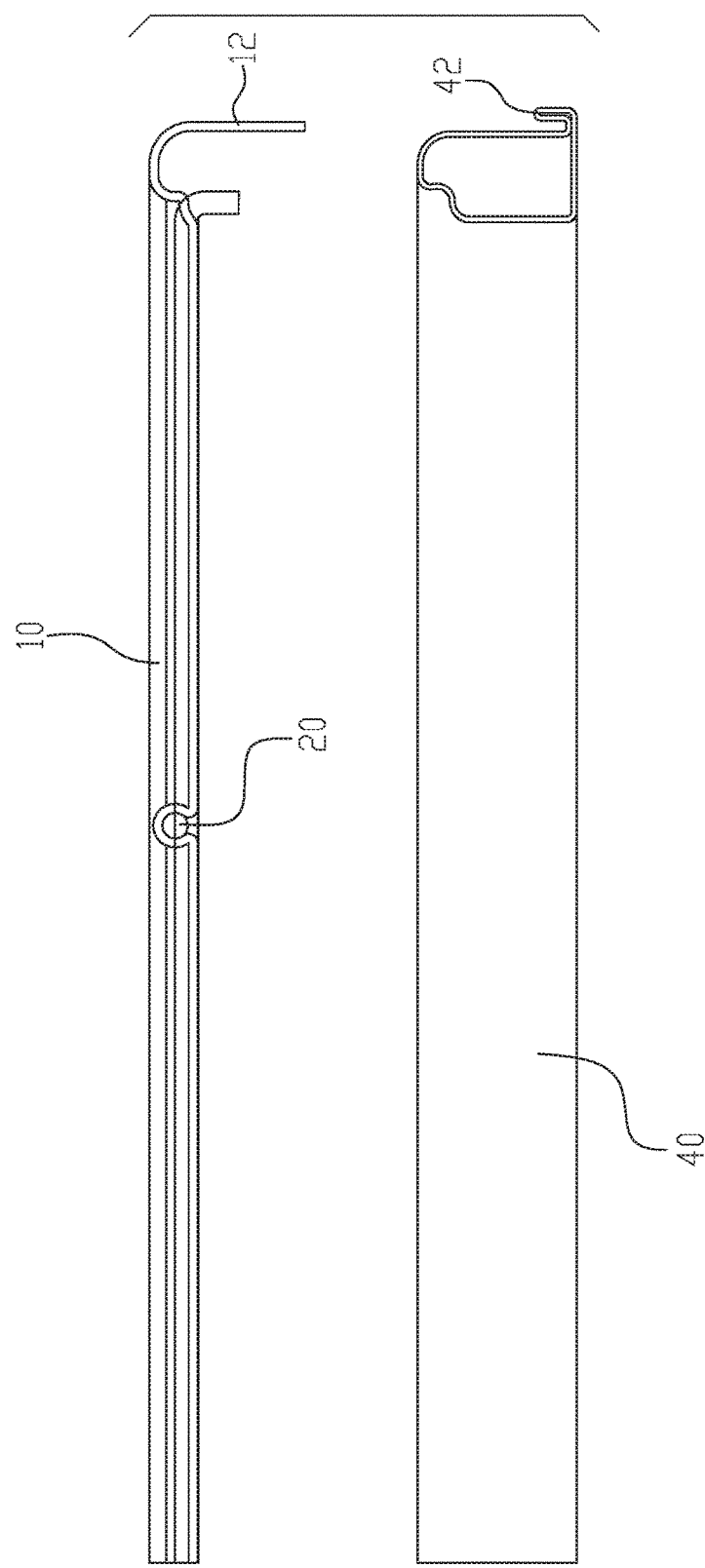
FIG. 12 illustrates an exploded diagram of the plastic board of FIG. 11.

Referring to FIG. 11 and FIG. 12, this embodiment differs from the first embodiment in that: the metal net 20 is connected to the bottom surface of the plastic board 10, and the metal net 20 is embedded to the plastic board 10 during the plastic board 10 is forming by absorbing and heating. The plastic board 10 is connected to the metal net 20 after cooling and contracting. That is to say, the plastic board 10 encases the metal net 20 when it is absorbing forming, forming a composite structure. Preferred, a frame 40 is configured, the frame 40 surrounds the plastic board 10, the periphery of the plastic board 10 extends downwardly to form a sidebar 12, the sidebar 12 surrounds the external side of the frame 40, the bottom portion of the external side of the frame 40 bends outwardly to form a hem 42, the hem 42 encases the lower edge of the side 12 of the plastic board. The metal net 20 is connected to the frame 40, the frame 40 is glued or locked to the plastic board 10.

The Ninth Embodiment

Figure 13:
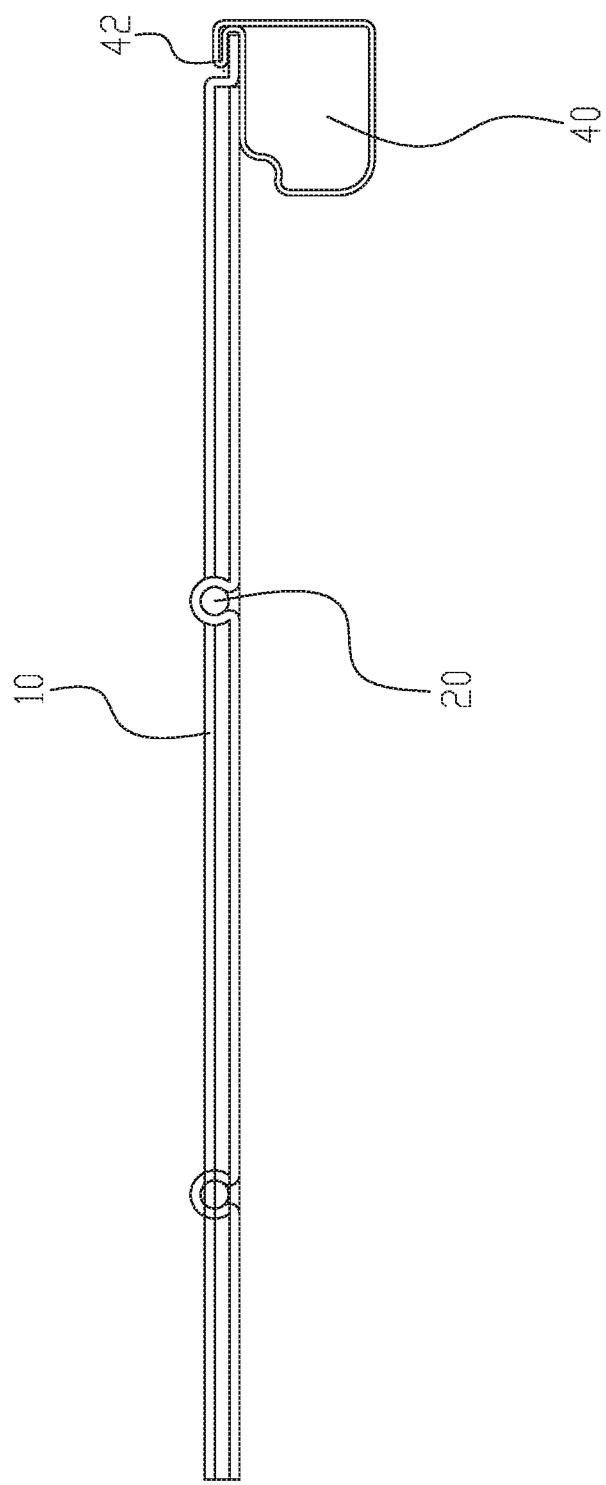
FIG. 13 illustrates a sectional diagram of a plastic board with metal net of a ninth embodiment of the present invention.
Figure 14:
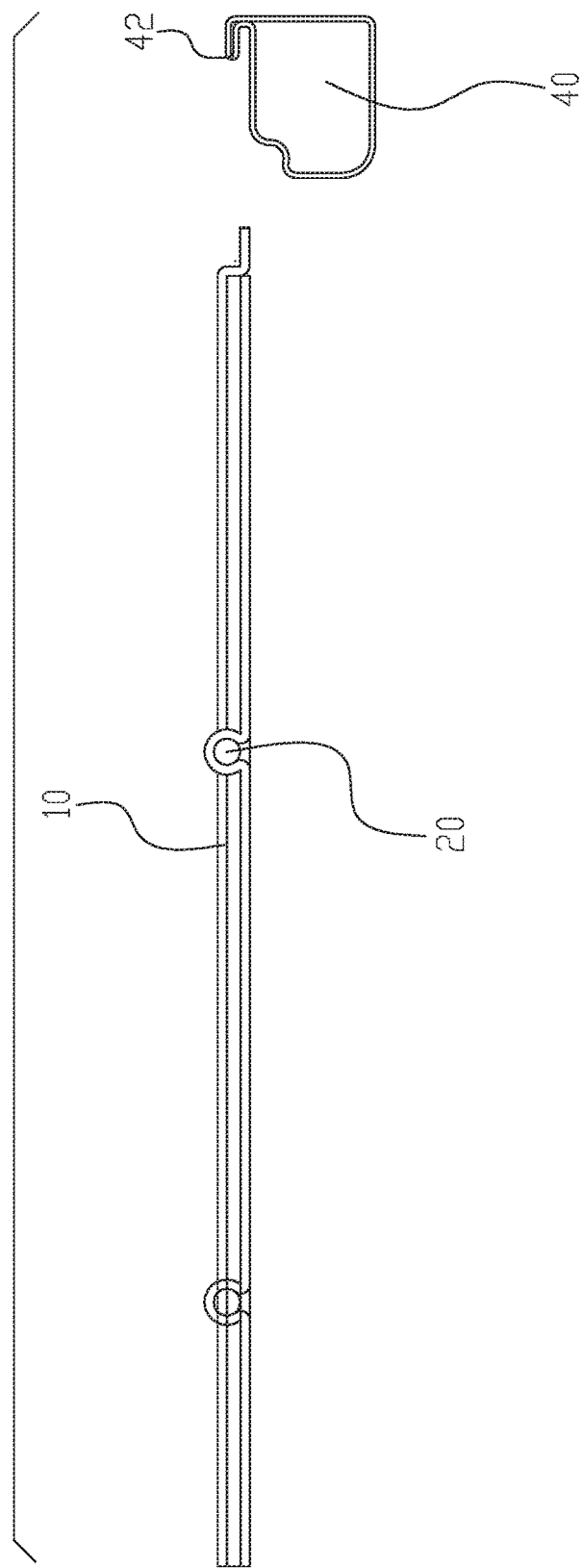
FIG. 14 illustrates an exploded diagram of the plastic board of FIG. 13.

Referring to FIG. 13 and FIG. 14, this embodiment differs from the eighth embodiment in that: the plastic board 10 is supported on the top surface of the frame 40, the external end of the top surface of the frame 40 bends to form a hem 42, the hem 42 encases the external edge of the plastic board 10.

Although the present invention has been described with reference to the preferred embodiments thereof for carrying out the patent for invention, it is apparent to those skilled in the art that a variety of modifications and changes may be made without departing from the scope of the patent for invention which is intended to be defined by the appended claims.

The invention claimed is:

1. A plastic board with metal net, comprising:
   a plastic board,
   a metal net, and
   an edge band, wherein the edge band is arranged along an edge of the plastic board and encases the edge of the plastic board and the metal net,
   wherein
   the metal net supports a bottom surface of the plastic board, and
   the plastic board encases the metal net by vacuum forming to make the plastic board and the metal net form a composite structure.

2. The plastic board with metal net according to claim 1, wherein the metal net is net welded or weaved by metal wire or a net made by pressing and extending a metal board.

3. The plastic board with metal net according to claim 1, further comprising a frame surrounding the metal net, wherein the metal net is connected to the frame.

4. The plastic board with metal net according to claim 3, wherein a periphery of the plastic board extends downwardly to form a sidebar,
the sidebar surrounds an external side of the frame, and
part or a whole of the plastic board covers the frame.

5. The plastic board with metal net according to claim 4, wherein
the edge band is arranged along a bottom edge of the sidebar of the plastic board, and
the edge band covers a connecting gap of the plastic board and the frame.

6. The plastic board with metal net according to claim 5, wherein the edge band encases a bottom surface of the frame.

7. The plastic board with metal net according to claim 5, wherein
a bottom surface of the frame has a groove,
a cross section of the edge band is U-shaped, and
an inner side of the edge band is inserted into the groove.

8. The plastic board with metal net according to claim 4, wherein
a bottom portion of the external side of the frame bends outwardly to form a hem, and
the hem encases a lower edge of a side of the plastic board.

9. The plastic board with metal net according to claim 4, wherein
a lower edge of a side of the plastic board bends inwardly and extends to form a hook portion,
a bottom portion of the external side of the frame has a groove, and
the hook portion is hooked to the groove.

10. The plastic board with metal net according to claim 1, further comprising:
a frame surrounding a periphery of the plastic board, wherein
the periphery of the plastic board extends downwardly to form a side,
the side surrounds an external side of the frame,
a bottom portion of the external side of the frame bends outwardly to form a hem, and
the hem encases an external edge of the plastic board.

11. The plastic board with metal net according to claim 1, further comprising:
a frame surrounding a periphery of the plastic board, wherein
the plastic board is supported on a top surface of the frame,
an external end of the top surface of the frame bends to form a hem, and
the hem encases an external edge of the plastic board.

12. A plastic board with metal net, comprising:
a plastic board
a metal net, which is net welded or weaved by metal wire, or a net made by pressing and extending a metal board, and
a frame surrounding the metal net,
wherein
the metal net is connected to the frame,
the metal net is disposed below the plastic board, and
a plastic element, which is disposed between the plastic board and the metal net, is used to connect the plastic board and the metal net.

13. The plastic board with metal net according to claim 12, wherein
a top surface of the plastic element and the bottom surface of the plastic board are glued or welded, and
the plastic element is locked to the metal net.

14. The plastic board with metal net according to claim 12, wherein
the plastic element is fixedly connected to the metal net, and
a top surface of the plastic element and a bottom surface of the plastic board are glued or welded.

15. The plastic board with metal net according to claim 12, further comprising:
a plurality of plastic elements, wherein
the plastic elements are evenly arranged in the metal net, and
the plastic elements are disposed at the nodes of the metal net.

16. The plastic board with metal net according to claim 12, further comprising:
an edge band, wherein
the edge band is disposed along an edge of the plastic board, and
the edge band encases an external edge of the plastic board and the metal net.

17. The plastic board with metal net according to claim 12, wherein
a periphery of the plastic board extends downwardly to form a side,
the side surrounds an external side of the frame, and
part or a whole of the plastic board covers the frame.

18. The plastic board with metal net according to claim 17, wherein
a bottom portion of the external side of the frame bends outwardly to form a hem, and
the hem encases a lower edge of a side of the plastic board.

19. The plastic board with metal net according to claim 17, wherein
a lower edge of a side of the plastic board bends inwardly and extends to form a hook portion,
a bottom portion of an external side of the frame has a groove, and
the hook portion is hooked to the groove.

20. The plastic board with metal net according to claim 12, further comprising:
a frame surrounding a periphery of the plastic board, wherein
the plastic board is supported on a top surface of the frame,
an external end of the top surface of the frame bends to form a hem, and
the hem encases an external edge of the plastic board.

21. A plastic board with metal net, comprising:
a plastic board,
a metal net, which is net welded or weaved by metal wire or a net made by pressing and extending a metal board, and
a frame surrounding the metal net,
wherein
the metal net is connected to the frame,
the metal net is disposed below the plastic board, and
the plastic board and the metal net are glued together.

* * * * *